(12) United States Patent
Bezzel et al.

(10) Patent No.: US 8,619,366 B2
(45) Date of Patent: Dec. 31, 2013

(54) INTEGRATION OF OPTICAL ELEMENT IN INSULATED GLAZING

(75) Inventors: Eik Bezzel, Hvalso (DK); Alicia Johansson, Copenhagen O (DK); Claus Barholm-Hansen, Vaerlose (DK)

(73) Assignee: Photosolar A/S, Hoje Taastrup (DK)

( * ) Notice: Subject to any disclaimer, the term of this patent is extended or adjusted under 35 U.S.C. 154(b) by 0 days.

(21) Appl. No.: 13/319,170

(22) PCT Filed: May 7, 2009

(86) PCT No.: PCT/EP2009/055543
§ 371 (c)(1),
(2), (4) Date: Dec. 28, 2011

(87) PCT Pub. No.: WO2010/127702
PCT Pub. Date: Nov. 11, 2010

(65) Prior Publication Data
US 2012/0099189 A1    Apr. 26, 2012

(51) Int. Cl.
*F21S 11/00* (2006.01)
*G03F 5/00* (2006.01)
*E06B 3/24* (2006.01)

(52) U.S. Cl.
USPC .............................. 359/591; 359/893; 428/34

(58) Field of Classification Search
USPC .................. 52/172; 428/34; 359/591, 893
See application file for complete search history.

(56) References Cited

U.S. PATENT DOCUMENTS

| | | | |
|---|---|---|---|
| 3,971,178 A * | 7/1976 | Mazzoni et al. | 52/172 |
| 4,204,015 A * | 5/1980 | Wardlaw et al. | 428/34 |
| 5,128,181 A * | 7/1992 | Kunert | 428/34 |
| 5,494,715 A * | 2/1996 | Glover | 428/34 |
| 6,315,356 B1 | 11/2001 | Tolinski | |
| 7,218,831 B2 * | 5/2007 | Pokorny et al. | 385/146 |
| 2001/0039771 A1* | 11/2001 | Town | 52/171.3 |
| 2004/0209020 A1* | 10/2004 | Castiglione et al. | 428/34 |
| 2005/0136198 A1* | 6/2005 | Bourlier et al. | 428/34 |
| 2005/0213233 A1* | 9/2005 | Bezzel et al. | 359/893 |
| 2009/0068384 A1* | 3/2009 | Seth et al. | 428/34 |

FOREIGN PATENT DOCUMENTS

| | | |
|---|---|---|
| AU | 2005202375 A1 | 6/2005 |
| FR | 2889858 A1 | 2/2007 |
| JP | 05104776 A | 4/1993 |
| JP | 09226032 A | 9/1997 |
| JP | 200531302 A | 2/2005 |
| JP | 2005-530069 A | 10/2005 |
| JP | 2006037499 A | 2/2006 |
| JP | 2006330100 A | 12/2006 |
| SU | 1063793 A | 12/1983 |
| WO | 9744690 A1 | 11/1997 |
| WO | 2008097507 A1 | 8/2008 |

* cited by examiner

*Primary Examiner* — Clayton E Laballe
*Assistant Examiner* — Kevin Butler
(74) *Attorney, Agent, or Firm* — Polsinelli PC; Teddy C. Scott, Jr.; Ron Galant

(57) ABSTRACT

Disclosed is a method for integrating at least one optical element inside an insulated glazing unit comprising at least two glass panes, where the optical element has a plurality of perforations and a non-perforated area, where the non-perforated area prevents penetration of light in a building where the insulated glazing unit is mounted, and where the perforations have a depth/width ratio that allows for passage of light with given angles of incidence, while light having other angles of incidence are unable to pass though the perforations, which provides a shading effect, and wherein the optical element is arranged between the two glass panes by means of an adhesive, and where the adhesive is substantially not present in the perforations of the optical element.

54 Claims, 9 Drawing Sheets a)

b)

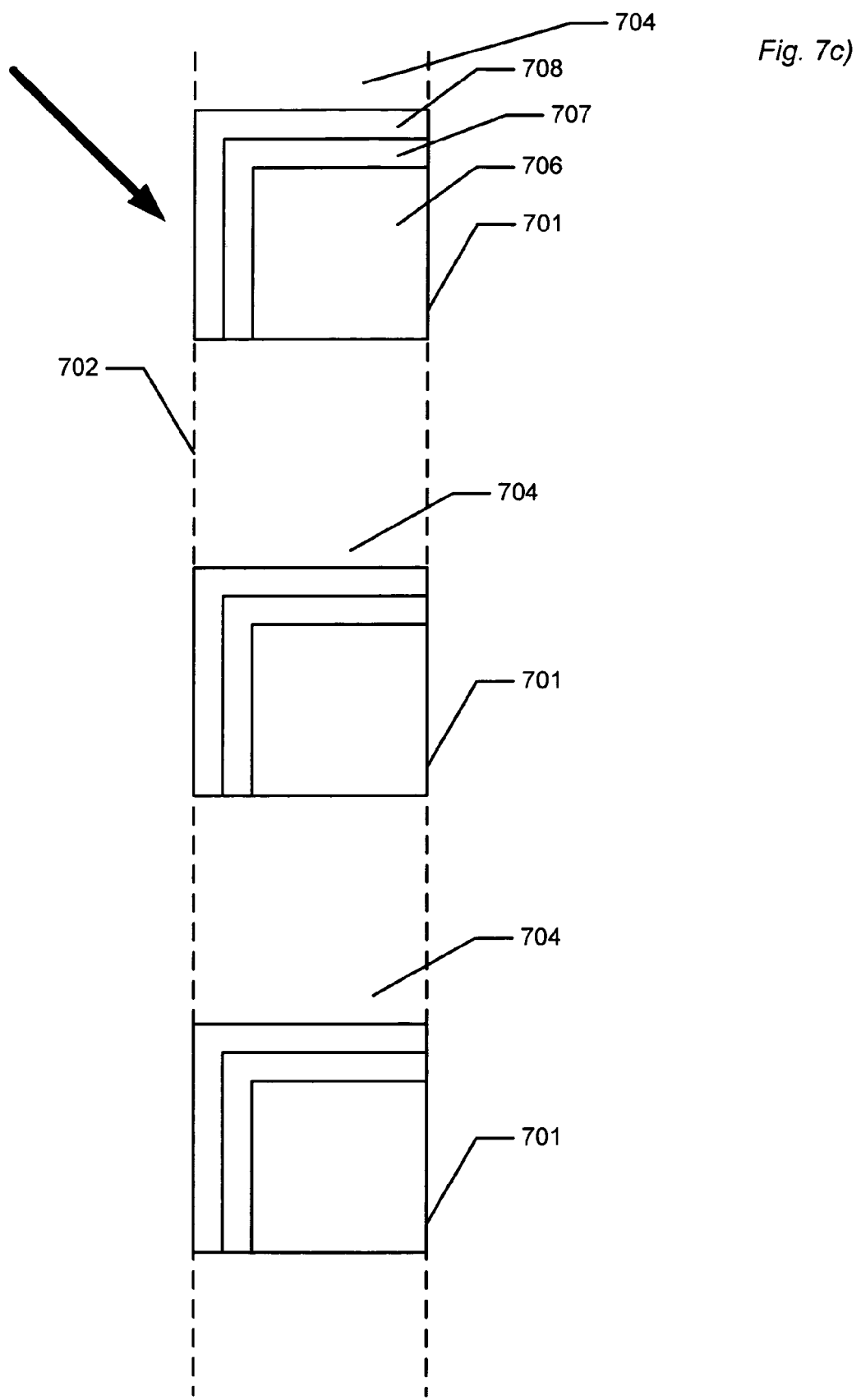

INTEGRATION OF OPTICAL ELEMENT IN INSULATED GLAZING

CROSS-REFERENCE TO RELATED APPLICATIONS

The present application is the national stage of International Application No. PCT/EP2009/055543, filed on May 7, 2009, the contents of all of which are hereby incorporated by reference.

FIELD OF THE INVENTION

This invention generally relates to a method of integrating an optical element in an insulated glazing unit. More particularly, the invention relates to an optical element having a plurality of perforations and a non-perforated area.

BACKGROUND OF THE INVENTION

Although large glass facades improve the architectural appearance of a building, a general disadvantage is overheating of the building caused by excessive solar transmittance of the facade. To solve this problem either air conditioning or solar shading, or a combination of the two, must be used. One of the primary motivations for the increased emphasis on solar shading has been governmental regulations (combined with a rise in energy prices) which require new buildings to be more energy efficient.

Solar shading devices can be placed either inside or outside the window or be integrated into the glazing unit.

Examples of indoor shading include Venetian blinds, Roman blinds, blinds, curtains, or internal shutters. Internal solar shading is efficient in terms of shading undesired light but thermally ineffective as the solar radiation is transformed into heat on the surface of the shading device. Thus, interior shading lead to a different distribution of heat inside the building while the total solar energy transmitted through the façade is unchanged compared to the façade without interior shading.

Examples of exterior shadings include Venetian blinds, solar screens, shutters and shading lamellas. Exterior shadings are efficient both in terms of reducing light and solar energy transmitted through the façade. The most distinct disadvantage of exterior shading is the need for maintenance and cleaning, and frequent mechanical failures of movable devices.

Examples of integrated solar shadings are solar shading foils, integrated Venetian blinds, tinted or coated glass, and integrated solar screens. The efficiency of integrated solar shadings depend on the actual type considered—typically the efficiencies of the best types are close to that of exterior shadings both in terms of reducing light and solar energy transmitted into the building.

Solar cells or photovoltaic cells may be mounted in combination with solar shadings to achieve both the advantages of shading and of the generation of electricity from converted solar energy by the photovoltaic effect.

U.S. Pat. No. 2,849,762 ("Combination of window and sun-proof screen") describes a solar shading device where Venetian blinds are integrated between two sheets of transparent material for example between the glass panes of a double-pane window. Usually Venetian blinds are suspended beneath a mounting bar which may comprise a device for tilting of the slabs and raising or lowering the louvers inside the glazing. Proper functioning of the blind requires a free suspension of each of the louvers, thus the blind requires a glazing of minimum inner dimension as the width of each of the slabs, and it should be mounted in the centre of the glazing. This limits the use of Venetian blinds, as they cannot operate in glazings which are not mounted essentially vertically, i.e. roof glazings. Also, interior mounted Venetian blinds cannot be adapted to glazings with a different shape than rectangular or quadratic such as triangular glazings or glazings with a curved (arch) top. Interior mounted Venetian blinds require a mechanical or electrical feed through and this feed through is a generic weak spot in the sealing of the glazing.

Tinted or coated glass panes reduce the incident radiation irrespective of the angle of the solar light with the result that the windows might shield too much of the light during winter and too little during summer. Moreover, the tinted or coated glass panes might influence the perception of the colour of objects observed through the window and objects illuminated by the light passing through the window.

Another type of solar shading devices are semitransparent screens that consist of a non-transparent screen with a small perforations to allow for passage of light. U.S. Pat. No. 5,379,824 ("Double window apparatus") describes an insect/solar screen which is placed between interior and exterior windows. The frame has air holes to allow for air flow into the space between the windows. A similar invention is presented in U.S. Pat. No. 6,315,356 ("Sunshade/Sunscreen combo") where a semi-rigid planar sunscreen having a plurality of openings allows for passage of light and wind. In both these cases, the sunscreen is not integrated in the sealed cavity of an insulating glazing itself. Instead it can be considered an integral part of the window, and it can be used when the window is open.

Optical elements, in form of a semitransparent screens, that are integrated in insulated glazing units are normally suspended inside the cavity or fully laminated to the panes inside the insulated glazing unit. In U.S. Pat. No. 6,259,541 B1 ("Light dispersive insulated glazing unit") a light dispersive film is integrated in the insulated glazing unit. The film is suspended midway between two glass panes and attached with an adhesive material at the edges of the window. This technique requires the glazing to be covered in full. Partial coverage is not possible as the film must be stretched between the spacer bars in order to maintain planarity. Furthermore, to avoid wrinkles the film is subjected to a heat treatment during the production, in which the film contracts to eliminate wrinkles.

A UV screen that is fully laminated to one of the interior sides of a double pane window is described in Patent US 200410209020A1. The space between the two glass panes is filled with an inert gas. This patent describes the method most commonly used in the glazing industry to integrate parts which are essentially flat plates or foils. The plate or foil is laminated between two sheets of PVB or EVA resin which again is laminated between two sheets of glass. The resins are cured under high pressure or vacuum while heated.

It remains a problem to provide an alternative method of integrating optical elements/solar screens in an insulated glazing unit.

SUMMARY

Disclosed is a method for integrating at least one optical element inside an insulated glazing unit comprising at least two glass panes, where the optical element has a plurality of perforations and a non-perforated area, where the non-perforated area prevents penetration of light in a building where the insulated glazing unit is mounted, and where the perforations have a depth/width ratio that allows for passage of light with given angles of incidence, while light having other angles of incidence are unable to pass though the perforations, which provides a shading effect, and wherein the optical element is arranged between the two glass panes by means of an adhesive, and where the adhesive is substantially not present in the perforations of the optical element.

Consequently, it is an advantage the optical element has perforations arranged in a non-perforated substrate, since it reduces the heating of the interior of a building that is caused by reducing the solar energy transmittance through the glazing. The optical element is mounted internally in the insulating cavity of an insulating glazing unit and compared to insulated glazings without any shading devices it reduces the solar energy transmittance significantly. The optical element is attached to one of the glass panes of the insulated glazing unit by an adhesive which covers at least a part of the area of the optical element. This method offers a number of advantages compared to using lamination or suspension of the optical element inside the glazing unit as known from prior art.

In prior art, optical elements or solar cells that are integrated between two glass panes are fully laminated over the entire surface and the objects inside the laminated cavity are fully embedded into the laminate material after the process. The transparent laminate material, which is most often EVA or PVB, will fill the perforations in the optical element. This is a disadvantage compared to when the perforations are not laminated and are only filled with air (or the gas used to fill the insulated glazing unit). When the perforations in the optical element are filled with air, the angle of the light inside the perforations is the same as the light angle on the outside of the window, since the refractive index is the same. Thus, when the solar angle is large, the light coming through the perforations will have the same large angle. If on the other hand, the perforations are filled with an adhesive material such as a resin or polymeric material, which has a refractive index that is higher than that of air, the angle of the light in the perforations will be smaller than the solar angle. This can clearly be seen from Snell's law in the description of FIG. 1 in the detailed description. The result is that light coming from large angles, such as in the middle of the day, can be transmitted through the holes that are filled with higher refractive index materials like laminate adhesive materials due to the reduction in the angle. For a similar non-laminated optical element the light would be reflected off or absorbed in the optical element. Hence, by using a fully laminated optical element the optical element will allow for passage of light from a considerably wider range of solar angles, compared to a non-laminated optical element that would only allow for passage of light for small or medium size solar angles. This selectivity in angular transmittance is a key issue for the present optical element and the motivation for using non-laminated modules is thereby very strong.

Thus, even though full lamination secures the fastening of a foil or plate between the two glass sheets, the disadvantage of that method is that it greatly influences the optical path of light through the shading device, which in many situations is undesired, and constitutes a compromise to the efficiency of the shading device.

If the selectivity of solar angle transmittance for an optical element where the perforations are filled with adhesive such as resin should be the same as for an optical element where the perforations are free of adhesive, the perforations in the optical element must be smaller to reduce the incoming light. However, reducing the dimensions of the perforations will increase the diffractive distortions which inevitably occur in an optical element of this type, and this leads to strong reduction of the see through quality.

It is a general desire with the described type of solar shading screen to design the perforations of the screen so that these cannot be seen with the human eye in selected viewing distances. At viewing distances near 1 meter, perforations with a minimum dimension of 0.45 mm have proved to fulfil this requirement. Repeated structures with holes of critical size less than 0.50 mm will form diffractions which are detectable with the human eye. The diffractions created are worse for smaller holes than for larger holes, and if the holes were to be filled with laminate resin a much smaller hole would be needed to achieve a solar screen with similar optical properties. Thus, if one realised a solar shading structure as described but using the usual lamination technique, the shading screen would need to be either much thicker or have smaller holes and hence the optical quality would be reduced by the diffraction caused.

The laminate itself may also reduce the see through quality as the tiny perforated holes can be difficult to fill entirely with laminate material. Thus, bubbles may form in the laminate around the perforations which may focus the light as a small lens—making this defect clearly visible. Moreover, the laminate requires more material and will thereby be more expensive than the method presented in this application.

In prior art the result is a laminated glass in which e.g. a solar screening device is fully embodied in PVB or EVA. The disadvantage of this method is that the holes in the solar screen will be filled with resin after curing, and as the refractive index of the resin is close to that of glass, the efficiency of the shading will be greatly compromised.

The optical element is attached to the interior of the insulated glazing unit (IGU) by an adhesive which may only cover a small fraction of the area of the screen. Compared to solar shadings that are fully laminated between two sheets of glass, the optical element according to the invention will have a significantly higher optical performance due to the fact that the perforations in the optical element are not filled with resin as in laminated solar shadings, but the optical element contains air or gas such as krypton or argon. As the refractive index of air or gas is close to one, the angle at which light pass the optical element is identical to the angle of the light outside the glazing.

Thus the optical element is different from fully laminated solar screens as it efficiently reduces the solar energy transmittance of high angle solar radiation. Also, the mounting technique described in this application enables use of solar screens with reduced diffraction and hence better optical quality.

Furthermore, the solar energy transmittance through the glazing into a building is regulated in relation to the position of the sun, i.e. the solar height above the horizon, by means of the design of the optical element. When the sun is positioned highest on the sky, the solar energy transmittance through the insulated glazing unit with the optical element is reduced the most, and thus the optical element provides the strongest shading of the sun, when it is needed the most.

The optical element is different from coated or tinted glass as the optical element provides shading of the direct solar beam with high efficiency. Furthermore, the optical element provides a progressive shading character as opposed to coated or tinted glass.

Another advantage by integrating the optical element into the glazing is that it is protected from damage and do not require additional cleaning. Thus there are no expenses to exterior or interior maintenance. Furthermore it is easier to clean the window where optical elements are integrated, since nothing has to be removed prior to cleaning, which is the case when using curtains, Venetian blinds, Roman blinds etc. By placing the optical element inside the window, i.e. between two glass panes, it will reflect and absorb part of the sunlight before the sunlight enters the interior of the building, and thereby the optical element reduces the heating of the building.

Another advantage is that compared to Venetian blinds, the perforations in the optical element can shield the direct radiation having large incident angles both in the vertical and the horizontal direction.

Moreover, as the optical element is mounted in the glazing without laminate material filling the perforated holes of the element, discolouring of the transmitted light is avoided completely. Hence the described method of fastening the element ensures neutral colour rendering of objects inside the building.

The optical element may also be known as or can be designated as e.g. sunscreen, sunshade, solar shading module, shading, solar screening etc. The insulated glazing unit may also be known as or can be designated as e.g. insulating glass unit, IGU, window etc. The glass pane may also be known as or can be designated as e.g. pane etc. The adhesive may also be known as or can be designated as e.g. tape, glue, resin, laminate etc. The perforations may also be known as or can be designated as e.g. openings, holes, slots, slits, transparent areas etc. The non-perforated areas may also be known as or can be designated as e.g. non-transparent areas, substrate etc.

In some embodiments the plurality of perforations constitutes transparent areas, and the non-perforated areas constitute non-transparent areas. The transparent areas may have a transparency of e.g. 50 percent. The transparent areas may be arranged sufficiently close to each other for the non-transparent areas to be essentially invisible to the naked eye, at least when the optical element is viewed from a given distance that corresponds, to common indoor facility viewing distances, e.g. 1 to 10 meters.

In some embodiments the non-perforated areas reflect and absorb light. It is an advantage that the non-perforated areas reflect and absorb light, because thereby the optical element provides shading and a reduction in the inflow of light from outside.

It is an advantage that the optical element has a number of perforations or openings or holes where the perforations may constitute a transparent area, and the screen material may be a non-transparent area that reflects and/or absorbs the sunlight. The transparent areas have a depth/width ratio that allows for passage of light with given angles of incidence, while light having other angles of incidence is unable to pass through the optical element.

In some embodiments the optical element is made from a rigid material. It is an advantage to use a rigid material for the optical element because it is easier to work with when attaching it to the glass. By using a rigid material the optical element does not have to be suspended to avoid wrinkles as in prior art. Moreover, since the optical element is flat, it can be mounted inside the glazing by attachment in discrete positions. The optical element does not have to be fully laminated or stretched as in prior art. It is enough to attach it only in a single edge or point.

The optical element may be a rigid screen which has previously been described in e.g. US 2005/0213233 and DK 176229.

In some embodiments the rigid material is adapted to remain unbuckled, when the material is hung up in a horizontal or vertical position at a rim or strip of the material relative to the geometry of the material or strip or relative to the mounting point.

In some embodiments the rigid material is sufficiently rigid to hold itself substantially stiff, when the material is hung up in a vertical position at a rim of the material.

In some embodiments the rigid material has a Young's modulus larger than 2 GPa.

It is an advantage that Young's modulus for the non-perforated optical element is larger than 2 GPa, since this value distinguishes rigid materials, such as rigid polymer, plastic, and metal from supple and softer materials such as foils e.g. plastic films, laminating films etc. Young's modulus or E-modulus describes the elastic modulus of the material. A high Young's modulus may be an advantage in relation to the present method, and Young's modulus of the non-perforated optical element may e.g. be 30 GPa in the present method. Thus in some embodiments the rigid material is not able to crumple, crease, curl, or crinkle under normal processing conditions.

In some embodiments the optical element is a metallic screen.

It is an advantage to use a metal for the optical element, since it may satisfy the requirements for e.g. rigidity.

In some embodiments the metallic screen is made of a material chosen from the group consisting of:
stainless steel;
ferrous alloy;
non-ferrous alloy;
aluminium based alloy.

It is an advantage to use an alloy such as e.g. bronze or the nickel steel alloy invar, or steel such as stainless steel, because these materials are inexpensive in cost, and easy to process etc.

In some embodiments the metallic screen is etched to produce the perforations.

It is an advantage to etch the perforations in a metallic screen, because the etching process provides a wide degree of design freedom to the shape of the shading element, and the etched perforations become visually pleasing with nice edges, and high geometrical precision, etc.

In some embodiments the optical element is a polymeric material.

It is an advantage to use a polymeric material for the optical element, since it may satisfy the requirements for e.g. rigidity.

In some embodiments the polymeric material is chosen from the group consisting of:
acrylic (PMMA);
stabilized polycarbonate (PC);
polyimid (PI);
polyetherimid (PEI);
glass filled compositions of the above;
other fillings in the above materials.

It is an advantage to use the above polymeric materials, because these materials may be inexpensive, easy to process etc.

In some embodiments the optical element is not significantly altered in a time period of years, when exposed to UV-light or temperature changes.

As the shading element is integrated into the insulating glazing it may remain substantially unchanged and stable during the entire expected life time of the glazing. This stability of the shading element relates to the shape, colour and relative position of the element inside the glazing cavity.

In some embodiments the adhesive is stable towards UV-light exposure. It is an advantage that the adhesive is stable towards ultraviolet—(UV) light exposure, since the adhesive, like the optical element, is exposed to sunlight, when integrated in an insulated glazing unit mounted on a façade of a building, and the adhesive should keep the optical element in place for the entire lifetime of the glazing.

In some embodiments the adhesive is stable towards temperature changes. It is an advantage that the adhesive is stable towards temperature changes, because the temperature of an insulated glazing mounted in a façade of a building can vary significantly during the seasons of a year and during day and night.

In some embodiments the adhesive maintains its adhesive properties in a time period of years.

It is an advantage that the adhesive maintains its adhesive properties over a time period of years, because then the insulated glazing with the optical element can remain to be functional without having to be replaced or repaired for many years.

In some embodiments the adhesive is transparent.

It is an advantage that the adhesive is transparent because it will improve the visual appearance of the optical element, when the adhesive used to attach the optical element can not be seen in the insulated glazing unit.

In some embodiments the adhesive and the optical element have substantially the same colour.

It is an advantage that the adhesive and the optical have the same colour because it will improve the visual appearance of the optical element, when the adhesive used to attach the optical element appears to be invisible.

In some embodiments the adhesive is subject to a substantially small extent of outgassing.

In some embodiments the adhesive does substantially not cause fogging in the insulating glazing unit.

In some embodiments the adhesive is chosen from the group consisting of:
  tape;
  glue;
  resin;
  polymeric material;
  epoxy;
  acrylic;
  UV curable acrylic;
  cyanoacrylate.

In some embodiments the adhesive is a double-sided adhesive tape.

It is an advantage to use double-sided adhesive tape, since the tape will then easily glue the optical element to the glass pane.

In some embodiments the adhesive tape has a core of foam which is compressible.

It is an advantage to use an adhesive tape which can be compressed, because glass and metal are heated at different speeds, and the optical element, e.g. metal, can then expand relative to the glass, and the difference in thermal expansion can be accommodated by the foam core of the tape. The compressible foam may be polyethylene.

In some embodiments the adhesive tape comprises a 3 mm wide, polyethylene foam core with acrylic adhesive on both sides.

In some embodiments the adhesive is a screen printed UV curable adhesive.

In some embodiments the optical element is adapted to be cut in size to correspond to at least one dimension of at least one of the glass panes of the insulated glazing unit.

It is an advantage that the optical element can be cut to fit the glass pane to which it shall be attached. For example the optical element may be cut to have the same length as the horizontal length of the glass pane.

In some embodiments the optical element is adapted to cover at least a part of the glass pane area.

Thus, the optical element may cover a fraction of the glass pane area, the fraction being smaller than the total glass pane area. By attaching more optical elements to the glass pane, the entire area of the glass pane may however be covered with optical elements. Alternatively, one optical element may cover the entire glass pane area.

In some embodiments the optical element is adapted to be attached anywhere on the glass pane.

It is an advantage of this embodiment compared to interior mounted Venetian blinds that this embodiment does not require a mounting bar in the top, and thus the optical element can be fitted into the glazing in any position. Furthermore, the optical element according to the invention can be mounted into odd-shaped glazings with ease. Also, the glazing itself can be mounted in any direction desired. Furthermore, the invention does not require any feed-through in the edge sealing of the glazing to control the optical element as is necessary in interior mounted venetian blinds and thus the present invention eliminates the risk of gas leakage from the glazing or water vapour penetration into the glazing.

Furthermore, it is an advantage of this embodiment that partial coverage of the glazing is possible as opposed to optical elements in the form of films, which are stretched inside the insulated glazing cavity.

In some embodiments two or more optical elements are adapted to be mounted on a glass pane with a gap between them.

In some embodiments two or more optical elements are adapted to be mounted on a glass pane so that they are abutting.

In some embodiments two or more optical elements are adapted to be mounted on a glass pane so that they are overlapping.

It is an advantage to mount optical elements in any of the above way on the glass pane, because it may be visually pleasing.

In some embodiments two or more optical elements each have an adhesive area along a first rim of the optical element, and where a first one of the two or more optical elements is attached at the first rim to a glass pane, and where a second one of the two or more optical elements is attached at the first rim partly to a second rim of the first one of the optical elements and partly to the glass pane so that the second rim of the first optical element is fixed on the glass pane by means of the first rim of the second one of the optical elements.

It is an advantage that the optical elements only need to have adhesive on one of their rims to be fully secured to the glass pane, since applying adhesive to just one rim is easy and fast and may reduce the amount of adhesive used.

In some embodiments the optical element is adapted to be attached to the glass pane by:
  applying adhesive on the glass pane to cover at least a part of the glass pane;
  attaching the optical element to the adhesive on the glass pane;
  removing any adhesive inside the perforations after the adhesive has hardened.

It is an advantage that any adhesive left inside the perforations in the optical element is removed after it has hardened, because thereby the perforations are kept free of adhesive when the insulated glazing with the optical element is in use as a shading device on a façade of a building.

In some embodiments any adhesive present in the perforations is removed by UV radiation exposure and subsequent decomposition of the UV radiated adhesive by means of a decomposition agent.

In some embodiments the optical element is adapted to be attached to the glass pane at one point.

It is an advantage that the optical element can be attached to the glass at just one point, because this may be an easy and fast method and may reduce the amount of adhesive used.

In some embodiments the optical element is adapted to be attached to the glass pane at one rim.

It is an advantage that the optical element can be attached to the glass at just one rim, because this may be an easy and fast method and may reduce the amount of adhesive used.

In some embodiments the adhesive is applied in one or more continuous lines.

In some embodiments the adhesive is applied in one or more dots.

It is an advantage to use as little adhesive as possible to have a visually pleasing window, and to minimize any outgassing and fogging from the adhesive.

In some embodiments the optical element is adhered to the glass pane by applying adhesive on at least a part of the non-perforated area of the optical element.

In some embodiments the adhesive is a tape having perforations corresponding to the perforations in the optical element.

In some embodiments the adhesive is a thin layer of glue applied on the non-perforated area of the optical element.

In some embodiments a first one of the at least two glass panes of the insulated glazing unit is an outermost glass facing outdoors, and a second one of the at least two glass panes is an innermost glass facing indoors.

In some embodiments the optical element is attached to an inner surface of the first one of the at least two glass panes.

It is an advantage that the optical element is attached to the inner surface of the first glass pane, which may be the outermost glass, because the optical element will then be protected by the two glass panes and thus be protected against both the outdoor and the indoor environment. Also, the solar energy absorbed in the solar shading element can be dissipated as heat and conducted to the exterior of the building when the shading element is in thermal contact with the glass facing the exterior side.

In some embodiments a third glass pane is arranged between the first and the second glass pane.

In some embodiments the optical element is attached to a surface of the third glass pane pointing towards the first glass pane.

It is an advantage that the optical element is attached to the third glass pane, which may be a middle glass pane arranged between the outermost and the innermost glass pane, because the optical element will then be protected by the outermost and the middle glass panes and thus be protected against both the outdoor and the indoor environment.

In some embodiments the adhesive is hidden from view by one or more screen printed patterns.

It is an advantage to use screen printed patterns to hide the adhesive, because the screen printed patterns provide a homogenous and uniform appearance, which is visually pleasing. Also, the screen printed patterns protect the adhesive against UV degradation.

In some embodiments one of the one or more screen printed patterns is arranged on the first one of the glass panes.

It is an advantage to provide a screen printed pattern on the first glass pane, which may be the outermost glass pane, for example if the optical element is attached to this glass pane, because then the adhesive used to attach the optical element is hidden by the screen printed pattern, and protected from UV exposure.

In some embodiments one of the one or more screen printed patterns is arranged on an inner face of the third glass pane.

It is an advantage to provide a screen printed pattern on the inner face of the third glass pane, which may be the middle glass pane, for example if the optical element is attached to this glass pane, because then the adhesive used to attach the optical element is hidden by the screen printed pattern.

In some embodiments one or more of the screen printed patterns is a grid.

In some embodiments one or more of the screen printed patterns comprises a glass enamel which is burned or fused onto the glass pane.

In some embodiments the adhesive is hidden from view by being applied to a non-perforated area on the optical element.

It is an advantage to hide the adhesive by applying it to non-perforated areas on the optical element, because it is therefore unnecessary and superfluous to provide further means for hiding the adhesive.

In some embodiments the optical element is adapted to be integrated with a solar cell material in the insulating glazing unit.

It is an advantage to combine the optical element with a solar cell or a photovoltaic device, because then both shading by means of the optical element and energy by means of the solar cell can be provided in one and the same insulated glazing unit. This generally optimizes the function of insulated glazing units and may save energy and space in a building.

The solar cell material may be integrated into the insulated glazing unit. Thus there may be no problems with exposed or vulnerable solar cell elements, which can fall down from roofs or walls in case of stormy weather.

Furthermore, when e.g. the sun is most powerful for instance in the summer time and in the middle of the day, the solar cell can produce a maximum of electricity which can be used in e.g. an air-conditioning system in the building for cooling the building inside.

Additionally, if the optical element is also functioning as a solar cell, an electrical feed-through to the solar cell can be provided in the edge sealing of the insulated glazing unit.

In some embodiments the non-perforated area of the optical element is adapted to be covered with the solar cell material.

It is an advantage to cover the optical element with a photo voltaic generator or solar cell, e.g. a thin film photo voltaic. Hereby, the optical element will provide efficient shading of the direct sunlight and convert the shaded off solar beam into usable electrical energy. The entire area, surface or face of the non-perforated area may be covered with solar cell material, i.e. both the front side, the back side and the inner side of the perforated areas or holes may be covered.

In some embodiments the solar cell material is adapted to cover an inside surface of the perforations in the optical element.

It is an advantage that the solar cell also is applied in the inside surface of the perforations, because radiation from the sun will also hit inside in the perforations and thus by applying solar cell material to these surfaces inside the perforations as well, there will be a larger yield of the solar radiation for use by the solar cell.

In some embodiments the solar cell material is an amorphous silicon thin film or a micro crystalline silicon thin film, or a combination hereof.

In some embodiments an electrical connection to the solar cell material is provided by means of an electrically conductive adhesive.

It is an advantage to use an electrically conductive adhesive, since it may have two functions: both to adhere the solar cell to the glass and to transport the electrical current from the solar cell.

The electrically conductive adhesive may then connect the solar cell to an exterior grid, which is a power transmission system or energy storage system of the electrical power produced by the solar cell.

In some embodiments the electrically conductive adhesive is adapted to be applied between one or more electrodes on a face of the optical element and a screen printed pattern on the glass pane.

It is an advantage also to include a screen printed pattern, because the screen printed pattern may hide the electrically conductive adhesive.

In some embodiments the adhesive is made conductive by applying an electrically conductive material to the adhesive.

In some embodiments the electrically conductive material is chosen from the group consisting of:
 silver particles;
 plastic particles covered with a metallic layer.

It is an advantage to use e.g. silver particles or plastic particles covered with metal, because these materials are relatively inactive chemically.

The present invention relates to different aspects including the method described above and in the following, and corresponding methods, devices, uses and/or product means, each yielding one or more of the benefits and advantages described in connection with the first mentioned aspect, and each having one or more embodiments corresponding to the embodiments described in connection with the first mentioned aspect and/or disclosed in the appended claims.

In particular, disclosed herein is an insulated glazing unit with at least one optical element integrated inside it, comprising at least two glass panes, where the optical element has a plurality of perforations and a non-perforated area, where the non-perforated area prevents penetration of light in a building where the insulated glazing unit is mounted, and where the perforations have a depth/width ratio that allows for passage of light with given angles of incidence, while light having other angles of incidence are unable to pass though the perforations, which provides a shading effect, and wherein the optical element is arranged between the two glass panes by means of an adhesive, and where the adhesive is substantially not present in the perforations of the optical element.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

DETAILED DESCRIPTION

In the following description, reference is made to the accompanying figures, which show by way of illustration how the invention may be practiced.

Figure 1:
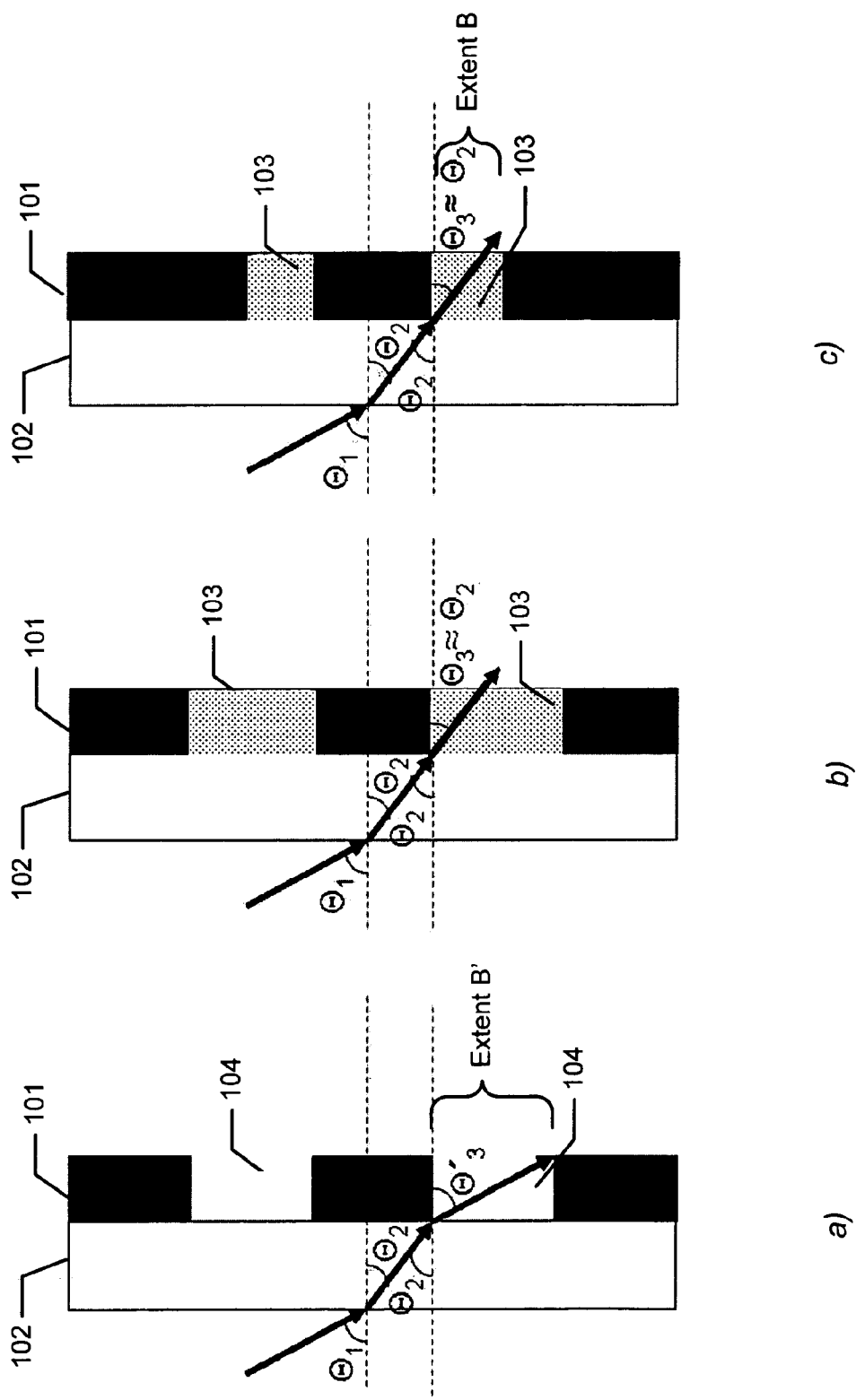
FIG. 1 shows examples of how an optical element functions.

FIG. 1 shows examples of how an optical element functions.

In prior art optical elements or solar cells that are integrated between two glass panes are fully laminated over the entire surface. The laminate will fill the perforations in the optical element. When the optical element is not laminated, the perforations in the optical element are not filled with adhesive such as resin, but are filled with air or the gas used to fill the insulated glazing unit, and the angle of the light inside the perforations is the same as the light angle on the outside of the window, since the refractive index is the same. Thus, when the solar angle is large, the light coming through the perforations will have a large angle, see FIG. 1a). If on the other hand, the perforations are filled with an adhesive material such as a resin or polymeric material, which has a refractive index that is higher than for air, the angle of the light in the perforations will be smaller than the solar angle, see FIG. 1b). This can clearly be seen from Snell's law below. The result is that light coming from large angles, such as in the middle of the day, can be transmitted through the holes that are filled with adhesive such as resin due to the reduction in the angle. For a similar non-laminated optical element the light would be reflected off or absorbed by the optical element. Hence, by using a fully laminated optical element the optical element will allow for passage of light from almost all possible solar angles compared to a non-laminated optical element that would only allow for passage of light for small or medium size solar angles.

If the selectivity of solar angle transmittance for an optical element where the perforations are filled with adhesive such as resin should be the same as for an optical element where the perforations are free of adhesive, the perforations in the optical element must be smaller to reduce the incoming light, see FIG. 1c). However, by reducing the size of the perforations diffractions will be more visible, and the see-through quality of the screen will be reduced.

The figure shows three cases where an optical element 101 is attached on a glass pane 102. In FIG. 1a) perforations 104 in the optical element 101 are filled with vacuum, air and/or gas with a refractive index of 1.0. In FIGS. 1b) and 1c) lamination is used and the perforations are filled with the laminate material 103. To have the same cut-off angle $\Theta_3$ for a laminated element as for a non-laminated element an optical element with smaller holes must be used as shown in FIG. 1c).

In the following example it is assumed that the optical element 101 should optimally have a cut-off angle of $\Theta_f = 60°$ i.e. when the solar height is larger than 60° above the horizon no direct light will be transmitted through the screen. Air has a refractive index of $n_f = 1$ and the glass of the glass pane 102 has a refractive index of $n_2 = 1.5$. When the solar height is 60°, according to Snell's law the solar angle in the glass pane 102 is:

$$\Theta_2 = \sin^{-1}\left(\frac{\sin\Theta_1 \cdot n_1}{n_2}\right) = \sin^{-1}\left(\frac{\sin 60° \cdot 1}{1.5}\right) = 35.3°$$

However, if the optical element 101 is laminated with an adhesive 103 e.g. EVA or PVB, which has a refractive index of about 1.48, the angle in the perforation filled with laminate 103 becomes:

$$\Theta_3 = \sin^{-1}\left(\frac{\sin\Theta_2 \cdot n_2}{n_3}\right) = \sin^{-1}\left(\frac{\sin 35.3° \cdot 1.5}{1.48}\right) = 35.9°$$

If on the other hand the optical element is not laminated and the perforations 104 are filled with air the angle is:

$$\Theta'_3 = \sin^{-1}\left(\frac{\sin\Theta_2 \cdot n2}{n_3}\right) = \sin^{-1}\left(\frac{\sin 35.3° \cdot 1.5}{1}\right) = 60.0°$$

which is the same as the solar height.

Furthermore, if the solar cut-off angle should be 60° and the thickness, t, of the optical element is 200 μm, the perforations that are filled with EVA must have an extent, B, of:

$B = \tan\Theta_3 \cdot t = \tan(35.9°) \cdot 200$ um = 145 um

However, if the perforations 104 are filled with air the extent B' of the perforations must be:

$B' = \tan\Theta'_3 \cdot t = \tan(60°) \cdot 200$ um = 346 um

Since diffractions are significantly more visible for 145 μm large holes compared to 346 μm holes this is a strong motivation for having large non-filled holes or non-laminated holes.

Figure 2:
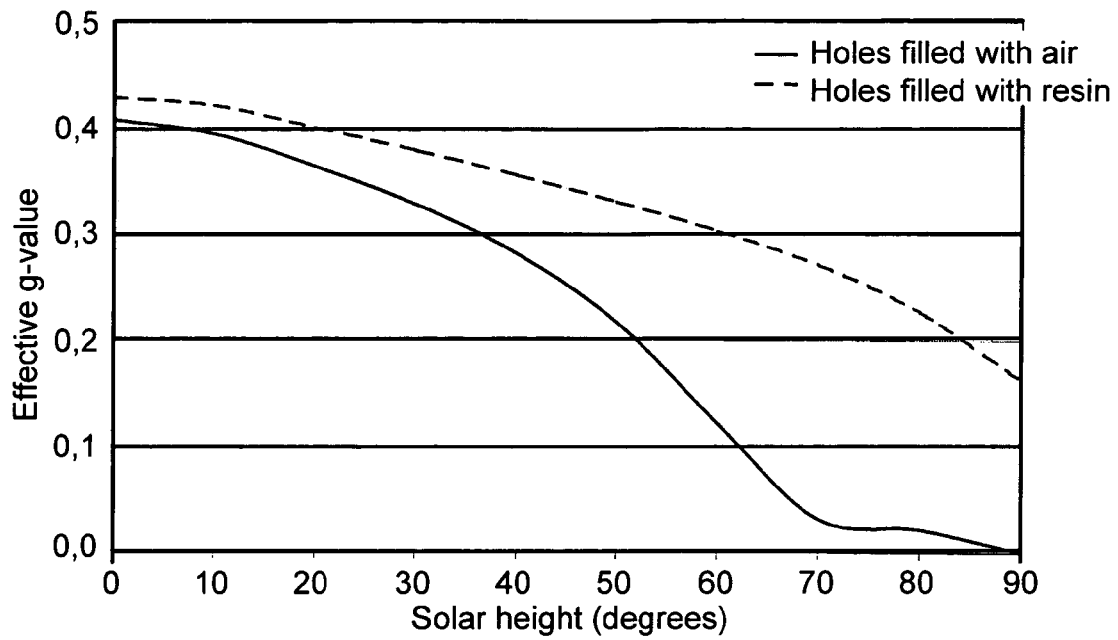
FIG. 2 shows graphs of the effective G-value for an optical element.
Figure 2:
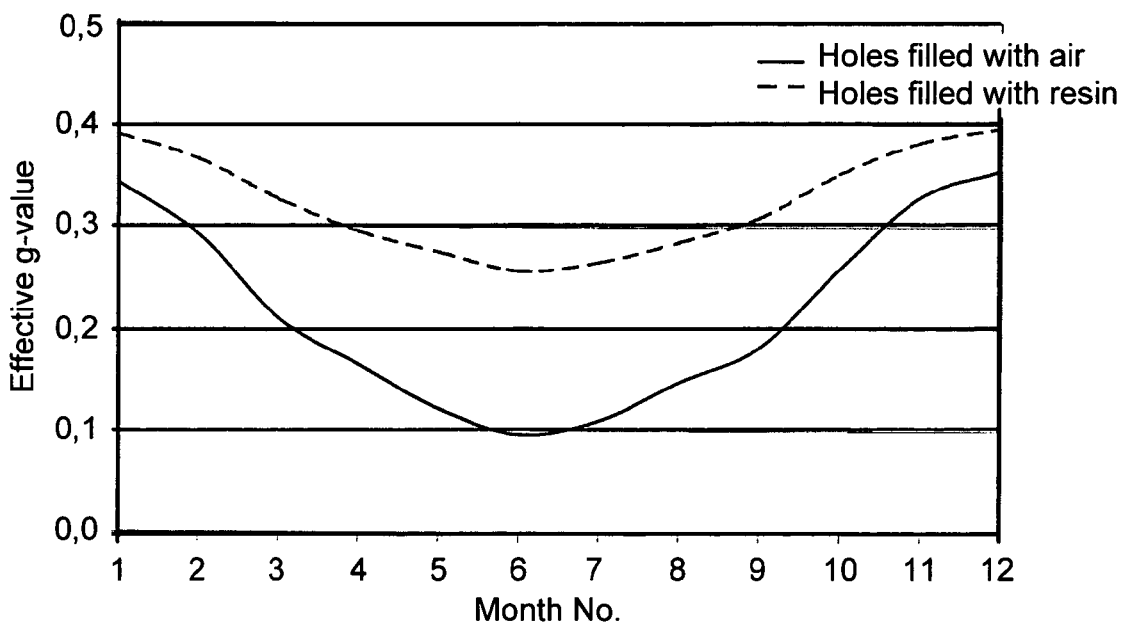

FIG. 2 shows graphs of the effective G-value (or solar heat gain coefficient) which is a measure of the solar energy transmittance for an optical element. The G-values are plotted for an optical element where the perforations are filled with air and the adhesive resin, respectively.

In FIG. 2a) the effective G-value is plotted as a function of the solar height in the sky, measured in degrees.

The G-value is significantly larger for perforation filled with resin i.e. a laminated element compared to a non-laminated element, where the perforations are filled with air.

The G-value is defined as the sum of the direct solar transmittance and the secondary internal heat transfer. The smaller the G-value, the better the shading. The graphs compare the solar shading of an optical element with perforations filled with air or gas such as argon, krypton and the like, and perforations filled with an adhesive, in this case laminate. It is clearly seen that the shading effect is larger for the air-filled perforations than for the laminated optical element, especially for large solar heights. Since the optical element is also shading progressively in the horizontal direction, the same result is obtained if the G-value is calculated as a function of increasing solar azimuths.

In FIG. 2b) the average effective G-value for a laminated element and a non-laminated element is plotted for each month of the year.

The optical element with the air-filled perforations has the largest shading effect. The effective G-values are calculated for a three pane argon-filled insulating glazing unit (IGU) placed in a south-facing façade in Copenhagen. The results can vary slightly depending on which types of glass panes that are used in the window, in what direction the window is placed and in what location.

Figure 3:
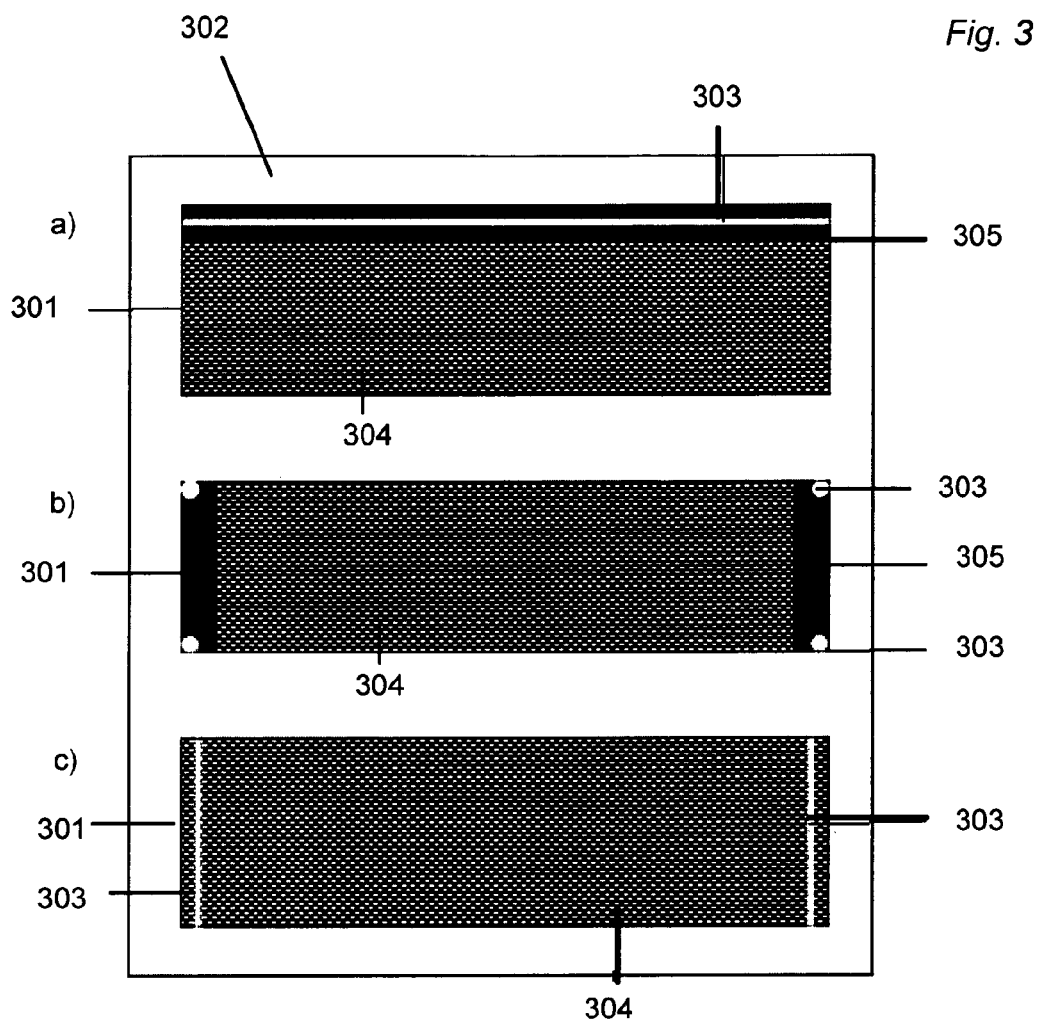
FIG. 3 shows examples of how an optical element can be attached to a glass pane.
Figure 3:
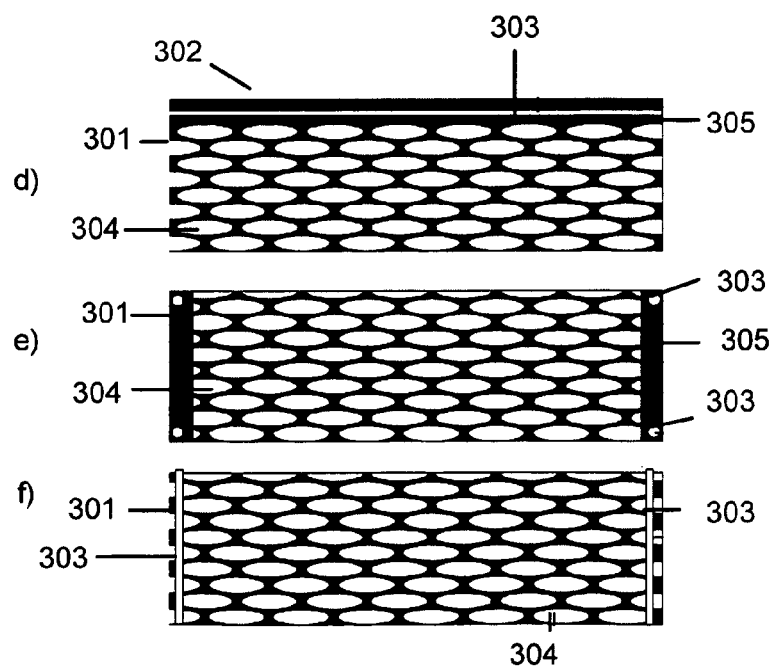

FIG. 3 shows examples of how an optical element can be attached to a glass pane.

The optical element 301 is attached to a glass pane 302 using an adhesive 303. The optical element 301 can have larger non-perforated areas 305 but the main area of the optical element 301 has perforations 304. The adhesive 303 can be applied in continuous lines as seen in FIGS. 3a), 3c), 3d) and 3f) and/or in small dots as seen in FIGS. 3b) and 3e).

FIGS. 3a-3c show examples where the perforations are relatively small compared to the size of the optical element, and FIGS. 3d)-3f) show examples where the perforations are relative large compared to the optical element.

Instead of using fully laminated solar screens as in prior art, the optical element according to the present method is mounted on a glass pane using an adhesive such as glue or tape. There are a number of possible ways to apply the adhesive between the optical element and the glass and some examples are shown in FIG. 3 where the adhesive is observed through the glass. The perforated optical element can have an area of non-perforated material were the adhesive can be applied. This non-perforated area can be arranged anywhere on the optical element. The non-perforated area has the advantage that it hides the adhesive in one viewing direction. The adhesive can be applied in one or more continuous line, in dots and/or the like. The lines can be vertical, horizontal, diagonal, sloping and/or the like, and the lines can be arranged in the middle, at one or more edges and/or anywhere suitable in the optical element.

Alternatively and/or additionally the adhesive may be applied in the perforated area of the optical element. Some of the perforations might initially be filled with adhesive, if the adhesive is applied on the perforated area. However adhesive in the perforations may be removed subsequently as described below. Furthermore, as long as the majority of the perforations are not filled, the optical element may remain its shading function. The adhesive can be hidden from view by using a screen printed pattern on the glass pane.

Figure 4:
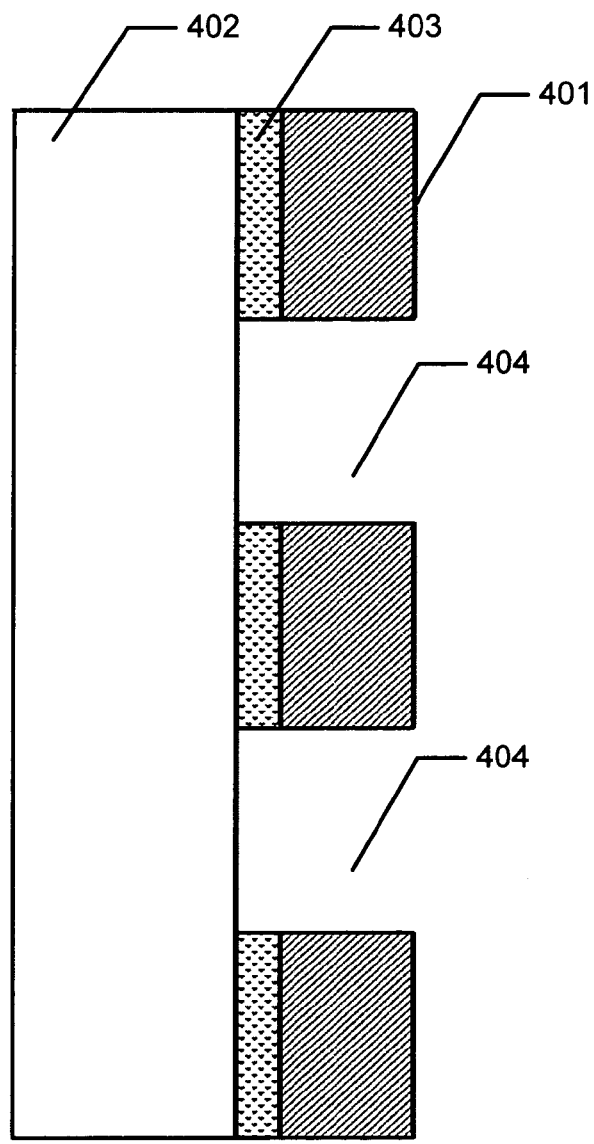
FIG. 4 shows an example where the optical element is attached to the glass pane.

FIG. 4 shows an example where the optical element is attached to the glass pane. The optical element 401 is attached to the glass pane 402 by means of an adhesive 403. The adhesive 403 may be a laminate film with perforations corresponding to the perforations 404 of the optical element 401.

Alternatively, the adhesive 403 may at first be a laminate film without perforations. Subsequently, the part of the laminate film which is present in the perforations 404 of the optical element 401 may be removed for ensuring that no material is present in the perforations 404, since a material such as lamination can influence the effect of the optical element.

An adhesive such as a laminate film present in the perforations can be removed by UV radiation exposure and subsequent decomposition of the UV radiated adhesive by means of a decomposition agent.

Alternatively the method may include gluing the optical element over a part of or over the entire perforated area without filling the space in the perforations. This can be done by using a tape which has small perforations that corresponds to the perforations in the optical element or by using a thin layer of glue that is only or mainly applied on the non-perforated areas. Alternatively the optical element can be attached to the glass pane by using a continuous film or layer of glue such as a laminate as long as the adhesive does not fill the holes.

The adhesive can be a tape or glue made from for example acrylic. Pure acrylic adhesives are both UV compatible and exhibit low emission values of organic vapours. Furthermore acrylic adhesives have shown superior resistance to mechanical creeping at elevated temperatures. Alternatively, the adhesive can be a screen printed UV curable adhesive. Also, the tape may comprise a foam core which is coated on both sides with an acrylic adhesive. The foam core can be made of polyethylene, polypropylene or other polymer foam material. The advantage of the foam core is improved stress relieve between the glass pane and the shading or optical element.

Figure 5:
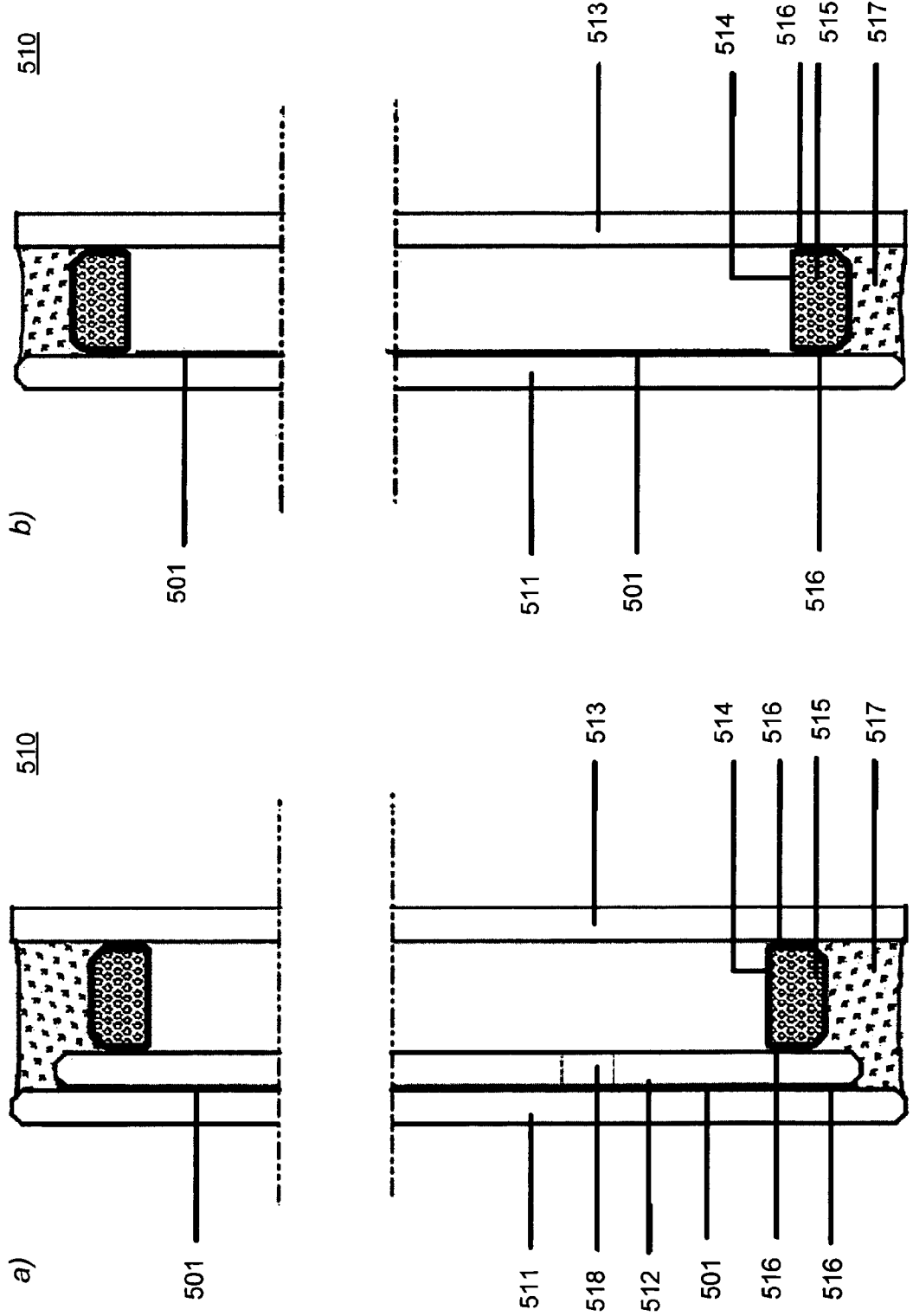
FIG. 5 shows examples of optical elements included in insulating glazing units.

FIG. 5 shows examples of optical elements included in insulating glazing units.

FIG. 5a) shows a cross section of an insulating glazing unit 510, showing an outer glass 511, a middle glass 512 with a venting hole 518, an inner glass 513, a spacer bar 514 filled with a desiccant 515, a primary sealant 516, a secondary sealant 517 and an optical element 501 attached to the outer glass 511.

FIG. 5b) shows a cross section of an insulating glass unit 510, showing an outer glass 511, a inner glass 513, a spacer bar 514 filled a with desiccant 515, a primary sealant 516, a secondary sealant 517 and an optical element 501 attached to the outer glass 511.

According to the present method for integrating non-laminated optical elements, the optical element is attached to the inner surface of the outermost glass pane in the IGU, if the IGU consists of two glass panes referred to as the outermost and the innermost glass. Alternatively, there may be one or more glass panes present between the outermost and the innermost panes of the IGU. In this case, the optical element may be attached to the outer surface of the or a middle glass.

If the optical element is placed on the inner surface of the outermost glass pane, it is sufficient only to have two glass panes for the insulated glazing unit, which will minimize the weight of the IGU. The adhesive used for attaching the optical element(s) may be visible from the outside of a building where the optical element is attached on a glass pane, and the optical element may be exposed to the incoming solar radiation through the outermost glass pane. In this case, the adhesive should be stable towards ultraviolet (UV) radiation and therefore not be influenced by the UV radiation. By using a screen printed pattern on the outermost glass pane, the adhesive can be shielded from UV radiation and be invisible from the outside.

To avoid that the adhesive is visible from the inside of the building the optical element can have a non-transparent area where the adhesive is applied.

A middle pane can also be included in the IGU. The optical element can then be placed both on the inner surface of the outer pane and on the outer surface of the middle pane. If the optical element is placed on the outer surface of a middle pane which is integrated between the outermost and the innermost glass pane, and the adhesive is placed on a non-transparent area of the optical element, the adhesive will be shielded from radiation from the outside and shielded from view. The adhesive can also be hidden from outside view by using a screen printed pattern on the outer pane. To hide the adhesive from the inside view a screen printed pattern can be applied on the inner surface of the middle pane.

If the adhesive is not hidden from view, the adhesive should be robust to UV-radiation. Additionally, it may be an advantage that the adhesive is visually pleasing, if it can be viewed from either the outside or the inside of the building in which the IGU is placed. To have a visually pleasing optical element the adhesive can be applied in small amounts, such as in small dots and/or thin lines, in well-defined areas, be transparent or have the same colour as the optical element.

The optical elements can be mounted with a gap in between to allow for more light to be transmitted though the window or they can be mounted next to each other so that they just touching or abutting each other. Another possibility is to let the elements overlap.

Figure 6:
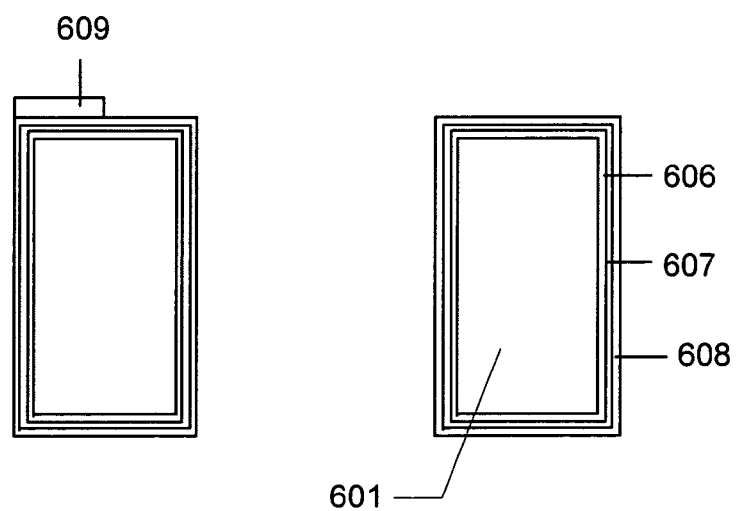
FIG. 6 shows an example of an optical element in combination with a solar cell.

FIG. 6 shows an example of an optical element in combination with a solar cell. The optical element 601 is coated with an electrically conductive coating 606, and on the outside of this a solar cell active material 607 and a transparent conductive coating 608 is present. A grid 609 of electrically conductive material is added to transport the electrical current produced from the solar cell.

For use together with a solar cell, the adhesive used to attach the optical element to the glass pane can be filled with a conducting material such as silver particles, if the adhesive should be electrically conductive. The thickness of the adhesive should be sufficient to allow for small movements of the optical elements due to differences in thermal expansion of the glass pane and the optical element. If exposed to UV radiation the adhesive should be stable to UV radiation for a time period of years and should not deform or change colour.

Figure 7:
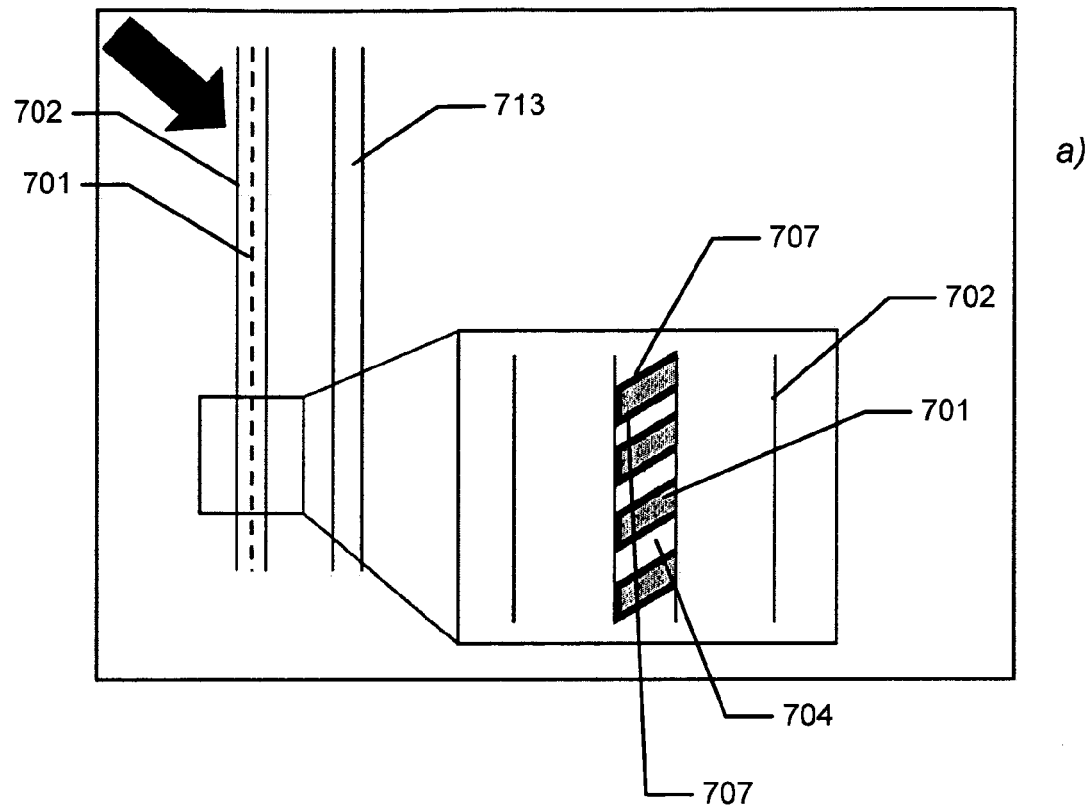
FIG. 7 shows examples of a solar cell film covering both the front side of the non-perforated area and the inner side of the perforated areas, i.e. the inner side of the holes.
Figure 7:
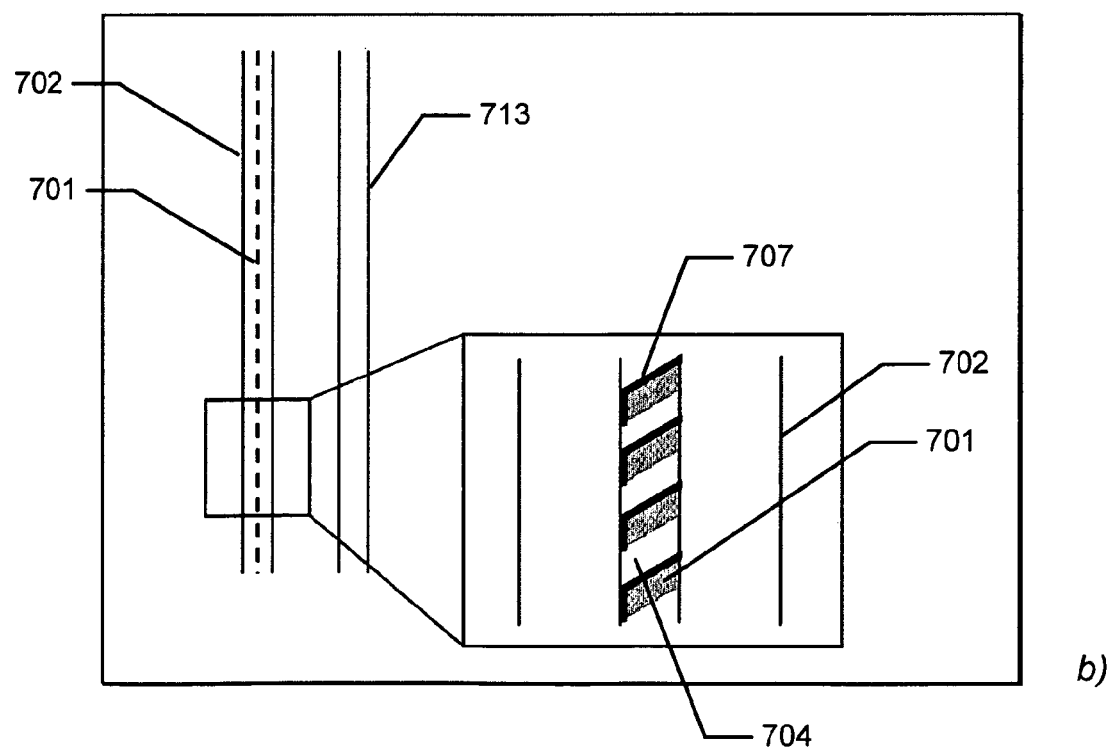

FIG. 7 shows examples of an optical element with a solar cell film covering both the front side of the non-perforated area and the inner side of the perforated areas.

Both FIG. 7a) and FIG. 7b) shows an optical element 701 attached to a glass pane 702. The squares to the left in the figures indicate an enlargement of the optical element seen to the right in the figures. An inner glass pane 713 is also shown.

In the enlargements of the optical element 701 it is seen that a thin film 707, for example a solar cell film, covers the front side of the non-perforated area of the optical film 701 and at least a part of the inner side of the perforated areas 704, i.e. the inner side of the holes in the optical element 701.

FIG. 7a) shows that besides the front side of the optical element 701, the entire inner side of the perforated areas 704 is also covered by or coated with the film 707, such as solar cell film.

FIG. 7b) shows that besides the front side of the optical element 701, a part of the inner side of the perforated areas 704 is also covered by or coated with the film 707, such as a solar cell film.

In FIGS. 7a) and 7b) the optical elements are shown to be sloped or inclined relative to the glass pane(s).

FIG. 7c) shows a number of optical elements 701 attached to a glass pane 702, where each optical element comprises a conducting substrate 706, a thin film photo voltaic coating or solar cell coating 707 and a transparent conducting oxide (TCO) coating 708. The solar cell coating 707 is applied on the front side of the non-perforated areas of the optical element 701 and on the inner side of the perforated areas 704 or holes of the optical element 701. The front side of the optical element is indicated by the sloped arrow indicating solar radiation.

In FIG. 7c) the optical elements are shown to be straight, right-angled or orthogonal relative to the glass pane.

By covering or coating a part of or the entire inner side of a perforated area of the optical element with a solar cell film, a bigger area of solar cell film will potentially be hit by sunlight, and thus more sunlight can be converted into electricity by means of solar cells.

Figure 8:
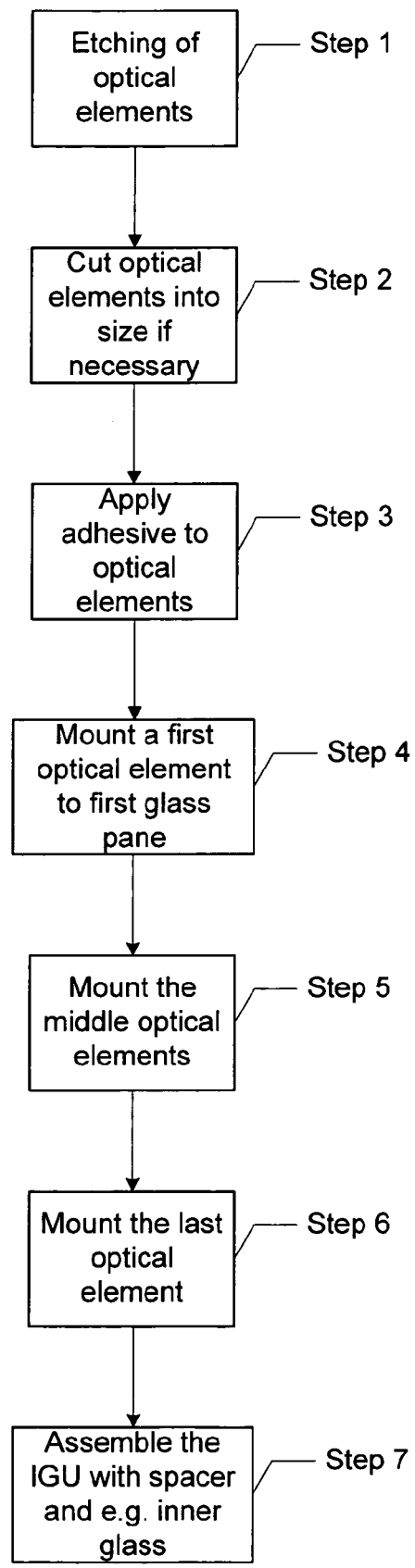
FIG. 8 shows a flow diagram with an example of how an optical element can be prepared and mounted on a glass pane.

FIG. 8 shows a flow diagram with an example of how an optical element can be prepared and mounted on a glass pane.

The number of glass panes in the IGU will influence the way the panes can be processed during the assembly and edge sealing of the IGU. The reference numbers in the following refer to the reference numbers in FIGS. 5a) and 5b).

EXAMPLE 1

Building a rectangular insulating glass unit with internally mounted optical elements as in FIG. 5b). The optical elements are not in contact with the edge seal.

Step 1: The optical element 501 in FIG. 5 may be produced from a thin strip of stainless steel which may be etched to obtain good shading properties for when the sun is high in the sky and shading is needed the most.

Step 2: To produce a rectangular IGU 510, the optical elements 501 are cut into lengths slightly shorter, typically 2 mm or 3 mm, than the inner width of the cavity defined by the length of the horizontal part of the spacer bar 514. The number of optical elements 501 needed to cover the glass pane is calculated by dividing the height of the glass pane with the height of the optical elements. An additional element may be needed to produce an element with a reduced height. The last gap on the glass may be just some percentage of the full element width.

Step 3: The optical elements may be supplied with e.g. a 3 mm wide double-sided acrylic adhesive 503 along one edge of the optical element. The adhesive may initially be covered with protective siliconed paper. Alternatively, the adhesive may be prefabricated on the optical elements or applied to the optical elements at en earlier stage of the process. The optical elements can now be mounted on the outer glass 511.

Step 4: The first optical element 501 is fixed by its adhesive 503 along the top rim of the glass a predefined distance from the edge.

Step 5: The second optical element may be mounted along the bottom rim of the first optical element in such a way that it slightly overlaps the first by a distance of e.g. 0.5 mm to 1 mm. This overlap eliminates false light between the optical elements and it also keeps the previous optical element fastened to the glass pane.

Subsequent optical elements are mounted on the glass pane until the lower edge of the glass is encountered.

Step 6: The last optical element may be cut lengthwise to fit the last position if this is smaller than the height of the optical element, and after the contingent cutting of the last optical element, it can be mounted on the glass pane.

Step 7: The IGU can now be assembled with a spacer and an inner glass 511 according to methods known in the IGU industry.

EXAMPLE 2

Building a rectangular IGU 510 with horizontally mounted optical elements 501. A middle glass pane 512 is included in the IGU 510, see FIG. 5a). The optical elements 501 are not in contact with the edge seal.

The steps 1-6 are the same as in example 1 above. However, prior to step 7 in example 1, the following step is included in the process:

Step between step 6 and step 7 from example 1: A middle glass 512 is, by means of the primary sealant 516 which may e.g. be poly-isobutylene, fixed on top of the outer glass 511 to cover the optical elements 501 so as to in effect create an optical element laminate. This laminate can be regarded as the outer glass in a standard IGU construction. It is washable since the optical element inside it is shielded by the two glass panes, and it can be processed on a standard production line. To ventilate the interior of the laminate, i.e. the space between the outer glass 511 and the middle glass 512, a small hole 518 of e.g. a diameter of Ø=6 mm may be fashioned in the middle glass 512. This will allow penetrating moisture to be absorbed in the desiccant material 515 in the spacer bar cavity. The hole 518 can be sealed during washing to avoid moisture in the laminate, e.g. by means of a small, removable piece of tape.

Although some embodiments have been described and shown in detail, the invention is not restricted to them, but may also be embodied in other ways within the scope of the subject matter defined in the following claims. In particular, it is to be understood that other embodiments may be utilised and structural and functional modifications may be made without departing from the scope of the present invention.

In device claims enumerating several means, several of these means can be embodied by one and the same item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. An insulated glazing unit with at least one optical element inside it, comprising at least two glass panes, where the optical element has a plurality of perforations and a non-perforated area, where the non-perforated area prevents penetration of light in a building where the insulated glazing unit is mounted, and where the perforations have a depth/width ratio that allows for passage of light with given angles of incidence, while light having other angles of incidence are unable to pass though the perforations, which provides a shading effect, wherein the optical element is arranged between the two glass panes and attached to one of the glass panes by means of an adhesive, which covers at least a part of the area of the optical element, and where the adhesive is substantially not present in the perforations of the optical element, and wherein the optical element is made from a rigid material having a Young's modulus larger than 2 GPa.

2. The insulated glazing unit of claim 1, wherein the plurality of perforations constitutes transparent areas, and the non-perforated areas constitute non-transparent areas.

3. The insulated glazing unit of claim 1, wherein the non-perforated areas reflect and absorb light.

4. The insulated glazing unit of claim 1, wherein the rigid material is adapted to remain unbuckled, when the material is hung up in a horizontal or vertical position at a rim or strip of the material relative to the geometry of the material or strip or relative to the mounting point.

5. The insulated glazing unit of claim 1, wherein the rigid material is sufficiently rigid to hold itself substantially stiff, when the material is hung up in a vertical position at a rim of the material.

6. The insulated glazing unit of claim 1, wherein the optical element is a metallic screen.

7. The insulated glazing unit of claim 6, wherein the metallic screen is made of a material selected from the group consisting of stainless steel, ferrous alloy, non-ferrous alloy, and aluminium based alloy.

8. The insulated glazing unit of claim 6, wherein the metallic screen is etched to produce the perforations.

9. The insulated glazing unit of claim 1, wherein the optical element is a polymeric material.

10. The insulated glazing unit of claim 9, wherein the polymeric material is selected from the group consisting of (a) acrylic (PMMA); (b) stabilized polycarbonate (PC); (c) polyimid (PI); (d) polyetherimid (PEI); (e) glass filled compositions of any of (a)-(d); and (f) other fillings in any of (a)-(e).

11. The insulated glazing unit of claim 1, wherein the optical element is not significantly altered in a time period of years, when exposed to UV-light or temperature changes.

12. The insulated glazing unit of claim 1, wherein the adhesive is stable towards UV-light exposure.

13. The insulated glazing unit of claim 1, wherein the adhesive is stable towards temperature changes.

14. The insulated glazing unit of claim 1, wherein the adhesive maintains its adhesive properties in a time period of years.

15. The insulated glazing unit of claim 1, wherein the adhesive is transparent.

16. The insulated glazing unit of claim 1, wherein the adhesive and the optical element have substantially the same colour.

17. The insulated glazing unit of claim 1, wherein the adhesive is subject to a substantially small extent of outgassing.

18. The insulated glazing unit of claim 1, wherein the adhesive does substantially not cause fogging in the insulating glazing unit.

19. The insulated glazing unit of claim 1, wherein the adhesive is selected from the group consisting of tape, glue, resin, polymeric material, epoxy, acrylic, UV curable acrylic, and cyanoacrylate.

20. The insulated glazing unit of claim 1, wherein the adhesive is a double-sided adhesive tape.

21. The insulated glazing unit of claim 20, wherein the adhesive tape has a core of foam which is compressible.

22. The insulated glazing unit of claim 20, wherein the adhesive tape comprises a 3 mm wide, double-sided acrylic material.

23. The insulated glazing unit of claim 1, wherein the adhesive is a screen printed UV curable adhesive.

24. The insulated glazing unit of claim 1, wherein the optical element is adapted to be cut in size to correspond to at least one dimensions of at least one of the glass panes of the insulated glazing unit.

25. The insulated glazing unit of claim 1, wherein the optical element is adapted to cover at least a part of the glass pane area.

26. The insulated glazing unit of claim 1, wherein the optical element is adapted to be attached anywhere on the glass pane area.

27. The insulated glazing unit of claim 1, wherein two or more optical elements are adapted to be mounted on a glass pane with a gap between them.

28. The insulated glazing unit of claim 1, wherein two or more optical elements are adapted to be mounted on a glass pane so that they are abutting.

29. The insulated glazing unit of claim 1, wherein two or more optical elements are adapted to be mounted on a glass pane so that they are overlapping.

30. The insulated glazing unit of claim 29, wherein the two or more optical elements each have an adhesive along a first rim of the optical element, and where a first one of the two or more optical elements is attached at the first rim to a glass pane, and where a second one of the two or more optical elements is attached at the first rim partly to a second rim of the first one of the optical elements and partly to the glass pane so that the second rim of the first optical element is fixed on the glass pane by means of the first rim of the second one of the optical elements.

31. The insulated glazing unit of claim 1, wherein the optical element is adapted to be attached to the glass pane by:
applying adhesive on the glass pane to cover at least a part of the glass pane;
attaching the optical element to the adhesive on the glass pane; and
removing any adhesive inside the perforations after the adhesive has hardened.

32. The insulated glazing unit of claim 31, wherein any adhesive present in the perforations is removed by UV radiation exposure and subsequent decomposition of the UV radiated adhesive by means of a decomposition agent.

33. The insulated glazing unit of claim 1, wherein the optical element is adapted to be attached to the glass pane at one point.

34. The insulated glazing unit of claim 1, wherein the optical element is adapted to be attached to the glass pane at one rim.

35. The insulated glazing unit of claim 1, wherein the optical element is adhered to the glass pane by applying adhesive on at least a part of the non-perforated area of the optical element.

36. The insulated glazing unit of claim 1, wherein the adhesive is a tape having perforations corresponding to the perforations in the optical element.

37. The insulated glazing unit of claim 1, wherein the adhesive is a thin layer of glue applied on the non-perforated area of the optical element.

38. The insulated glazing unit of claim 1, wherein a first one of the at least two glass panes of the insulated glazing unit is an outermost glass facing outdoors, and a second one of the at least two glass panes is an innermost glass facing indoors.

39. The insulated glazing unit of claim 1, wherein the optical element is attached to an inner surface of the first one of the at least two glass panes.

40. The insulated glazing unit of claim 1, wherein a third glass pane is arranged between the first and the second glass pane.

41. The insulated glazing unit of claim 40, wherein the optical element is attached to a surface of the third glass pane pointing towards the first glass pane.

42. The insulated glazing unit of claim 1, wherein the adhesive is hidden from view by one or more screen printed patterns.

43. The insulating glazing unit of claim 42, wherein one of the one or more screen printed patterns is arranged on the first one of the glass panes.

44. The insulated glazing unit of claim 42, wherein one of the one or more screen printed patterns is arranged on an inner face of the third glass pane.

45. The insulated glazing unit of claim 42, wherein one or more of the screen printed patterns is a grid.

46. The insulated glazing unit of claim 42, wherein one or more of the screen printed patterns comprises a glass enamel which is fused onto the glass pane.

47. The insulated glazing unit of claim 1, wherein the adhesive is hidden from view by being applied to a non-perforated area on the optical element.

48. The insulated glazing unit of claim 1, wherein the optical element is adapted to be integrated with a solar cell material in the insulating glazing unit.

49. The insulated glazing unit of claim 48, wherein the non-perforated area of the optical element is adapted to be covered with the solar cell material.

50. The insulated glazing unit of claim 48, wherein the solar cell material is an amorphous silicon thin film, a micro crystalline thin film, or a combination hereof.

51. The insulated glazing unit of claim 48, wherein an electrical connection to the solar cell material is provided by means of an electrically conductive adhesive.

52. The insulated glazing unit of claim 51, wherein the electrically conductive adhesive is adapted to be applied between one or more electrodes on a face of the optical element and a screen printed pattern on the glass pane.

53. The insulated glazing unit of claim 51, wherein the adhesive is made conductive by applying an electrically conductive material to the adhesive.

54. The insulated glazing unit of claim 51, wherein the electrically conductive material is selected from the group consisting of silver particles and plastic particles covered with a metallic layer.

* * * * *